United States Patent [19]

Åsberg

[11] Patent Number: 4,527,924
[45] Date of Patent: Jul. 9, 1985

[54] BALL JOINT FOR SUSPENSION OF WHEELS

[75] Inventor: Sture Åsberg, Västra Frölunda, Sweden

[73] Assignee: SKF Nova AB, Gothenburg, Sweden

[21] Appl. No.: 597,926

[22] Filed: Apr. 9, 1984

[30] Foreign Application Priority Data

May 18, 1983 [SE] Sweden .............................. 8302780

[51] Int. Cl.$^3$ ........................................... F16C 11/06
[52] U.S. Cl. ..................................... 403/76; 403/135; 403/138
[58] Field of Search ................. 403/76, 138, 135, 134, 403/140

[56] References Cited

U.S. PATENT DOCUMENTS

| | | | |
|---|---|---|---|
| 3,180,655 | 4/1965 | Gerner | 403/140 X |
| 3,273,909 | 9/1966 | Muller et al. | 403/138 X |
| 3,329,454 | 7/1967 | Melton et al. | 403/135 X |
| 3,409,317 | 11/1968 | Richards | 403/138 |

FOREIGN PATENT DOCUMENTS 152111  10/1951  Australia .............................. 403/135

Primary Examiner—Andrew V. Kundrat
Attorney, Agent, or Firm—Eugene E. Renz, Jr.

[57] ABSTRACT

The invention refers to a ball joint for suspension of wheels of motor cars and the like. It is characterized thereby that the attachment portion which extends from the very ball is designed with or provided with a fixed mounting flange.

6 Claims, 4 Drawing Figures

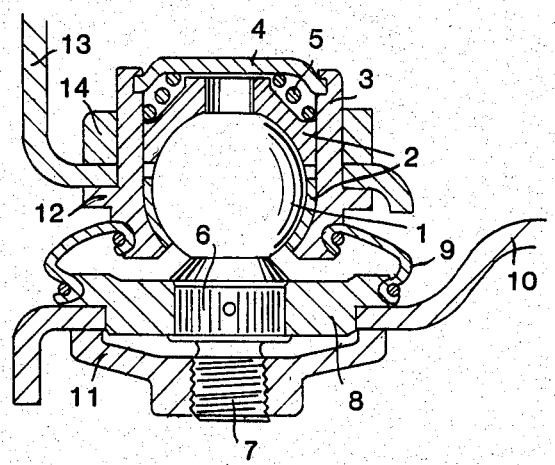
FIG. 1
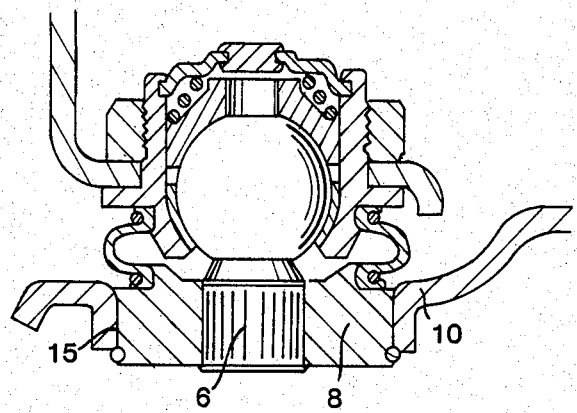
FIG. 2
FIG. 3
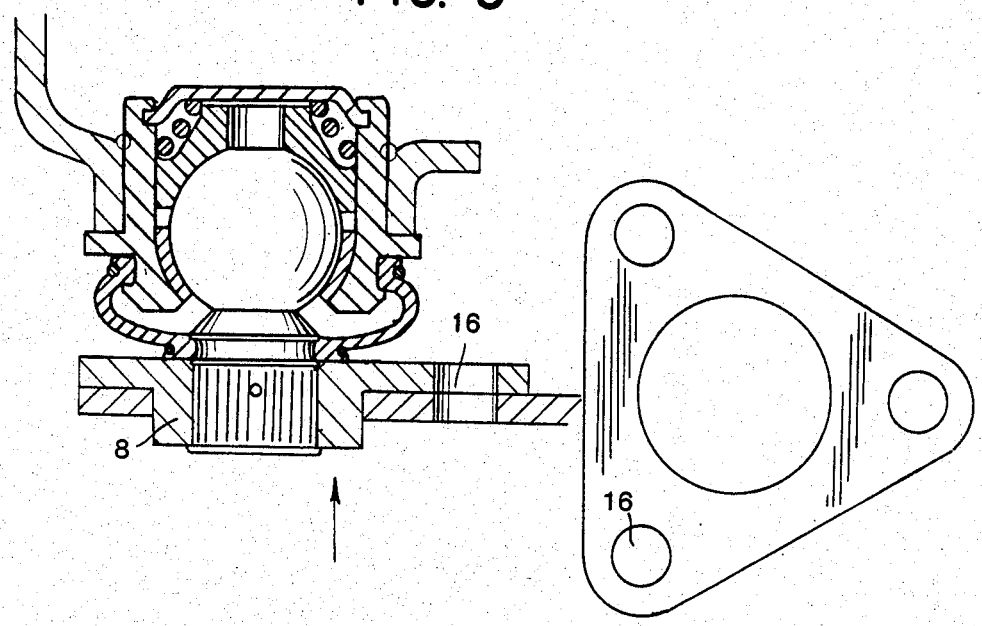

BALL JOINT FOR SUSPENSION OF WHEELS

BACKGROUND OF THE INVENTION

The present invention refers to a ball joint for suspension of wheels, particularly for front wheels of motor cars and similar heavier vehicles.

The common arrangement for connecting the steering spindle function of the front wheels to the suspension system is by means of ball joints, whereby the wheel will have its freedom of movement for yielding and turning relative to the car.

These ball joints consist of a ball which is movably arranged between two bearing seats, whereby the ball is provided with a projecting bolt-like member for attachment. This bolt-like member incorporates a neck situated nearest to the ball, thereupon a tapering member, which is tightened with aid of thread and nut, or a cylindrical member, which is clamped by aid of a separate screw device. The ball member with its seats is surrounded by a housing with fitting device. Between the housing and the connecting bolt there is arranged a seal to prevent contaminants from entering between the ball and its surrounding seats. This type of ball joint must not be mixed up with the ball joint of the steering arm, which has quite another function and other requirements and where other embodiments are common.

The above embodiments for attachment of the bolt like member require that the opposite element, to which it is to be attached, be manufactured from forge iron or casting, which results in heavy, expensive and non-rational structures.

It has therefore since long been a strong desire to be able to use pressed sheet metal for connection to the ball joint instead of these heavy structures.

SUMMARY OF THE INVENTION

This problem has been solved according to the invention and it has been provided a ball joint for suspension of wheels for motor cars and the like, which is characterized thereby that it at the connection part of the ball is designed with or provided with a fixed attachment flange.

It is according to the invention expedient that the flange is fitted to the connection part of the ball by press fit or the like, but it can also be made in one piece with the connection part.

According to the invention the housing surrounding the ball may be provided with a mounting flange, and it is thereby obtained a unit having two flanges.

BRIEF DESCRIPTION OF THE DRAWINGS

The invention hereinafter will be further described with reference to the accompanying drawings.

FIG. 1 shows a ball joint according to the invention in cross-section;

FIG. 2 shows another embodiment; and

FIGS. 3 and 4 show two furtrher embodiments having non-circular flanges.

BRIEF DESCRIPTION OF THE PREFERRED EMBODIMENTS

Figure 4:
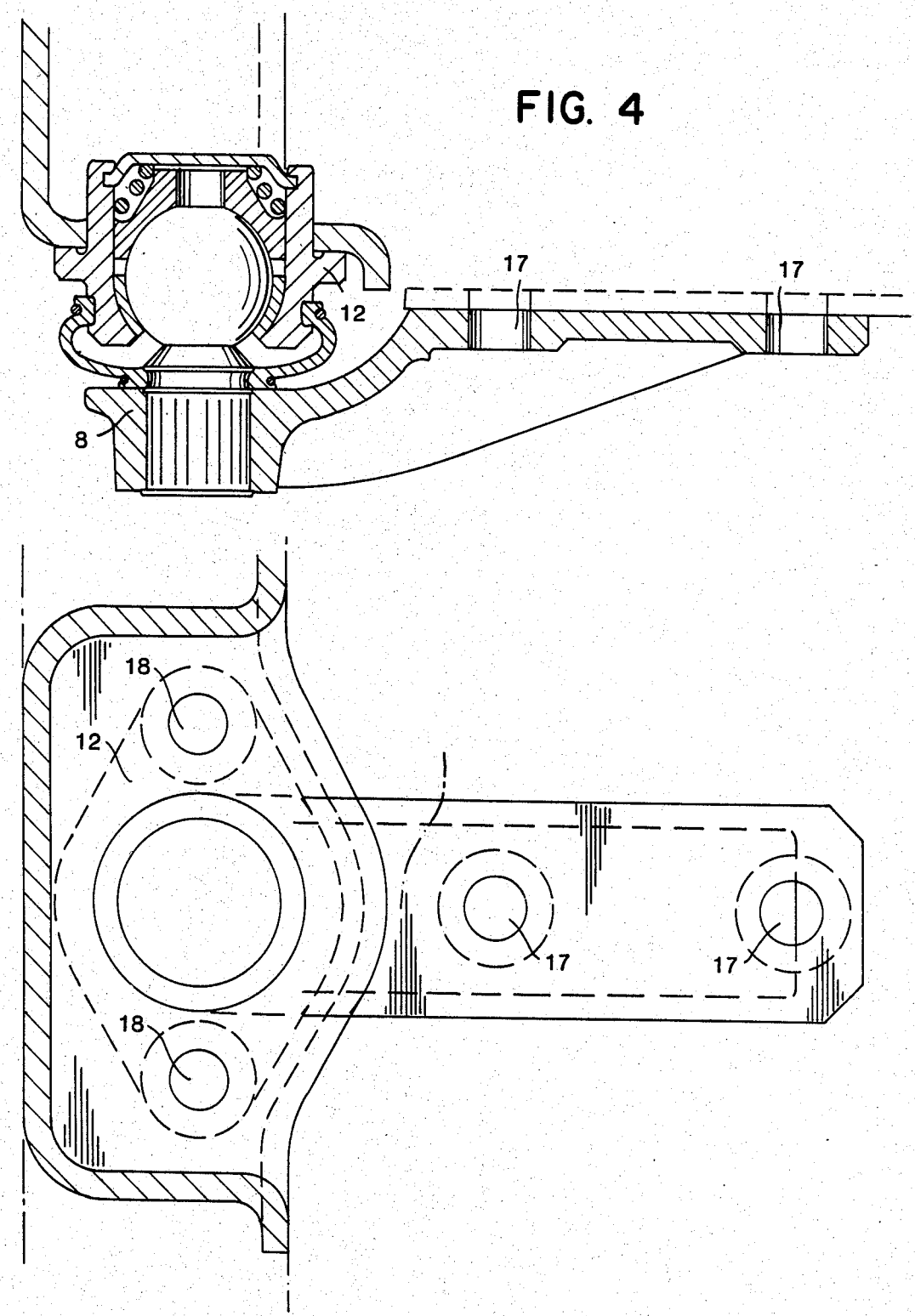

In FIG. 1 is shown a ball joint according to the invention having a ball 1, which is supported by two bearing seats 2 in a housing 3. In the housing is inserted a cover 4 and a spring 5 urging the upper bearing seat 2 against the ball. At the lower part of the ball, according to the drawing, there is an attachment bolt 6, which is provided with an outer, threaded portion 7. According to the invention there is fitted a flange 8 on the attachment bolt 6 by means of press fit. The ball joint is finally provided with a seal 9. By means of the flange 8 is it possible to screw the ball joint on to a sheet 10, which has a big hole. A nut 11 which cooperates with the threaded part 7 anchors the ball joint to the sheet 10. In this manner is obtained a safe attachment of the ball joint to a pressed sheet. Due to the fact that it has been possible to make the hole in the pressed sheet big, the attachment of the ball joint will be secure from a strength point of view. The housing 3 surrounding the ball is also shown provided with a flange 12. The steering spindle housing which is screwed on with a nut 14 rests on this flange.

FIG. 2 shows a device resembling to that of FIG. 1 but with a flange 8 of somewhat different design. This flange is also fitted to the attachment bolt 6 by means of press fit. It is on its outer side 15 knurled for giving a more reliable attachment to the pressed sheet 10.

FIG. 3 shows an embodiment similar to that of FIG. 2 but having a flange 8 which is non-circular. It is instead made as an equilateral triangle with bolt holes 16.

FIG. 4 finally shows a further embodiment of the invention with a non-symmetrical flange which is extended towards one side and provided with bolt holes 17. The flange 12 on the housing surrounding the ball has been given an oval shape and it has been equipped with bolt holes 18.

By means of the present invention, i.e. to arrange a particular attachment flange on the manner described above, it has become possible to connect the ball of the ball joint directly to a pressed sheet. The attachment to the sheet can due to the flange be accomplished on a large diameter, whereby the breaking moment loads can be absorbed. The big hole in the sheet furthermore facilitates the centering and absorption of the shear forces.

The flange showed, as mentioned above, should be made separately and it should be connected to the ball with a medium force fit. It will thereby become possible first to mount the bearing seat to the ball by threading it over the ball before the flange is mounted. The very manufacturing method for ball and flange is also facilitated, but if it is considered appropriate, it is possible to make the flange and the ball part in one piece.

The ball joint is hereabove described as a unit with two flanges for connection to transversal link arm and steering knuckle housing, both made in pressed sheet. The embodiment shown are only examples of the invention, and this can be varied in several manners within the scope of the claims.

I claim:

1. A ball joint for suspension of wheels for motor vehicles or the like comprising a ball member supported in a bearing seat in a housing, an attachment bolt member formed integrally with the ball member having an outer threaded portion, a nut member cooperating with the threaded portion to secure the assembly to a sheet metal support member having an opening therein of a predetermined diameter and a flange secured by a press fit to the intermediate portion of the ball member between the ball and threaded portion which engages in the opening of the said support member, said opening and flange member being of a larger diameter than the diameter of said ball, said flange being of a greater cross section than the cross section of said sheet metal support member.

2. A ball joint in accordance with claim 1 wherein said flange is connected to the bolt member by means of a press fit.

3. A ball joint is claimed in claim 1 wherein said flange member is formed integrally with said attachment bolt member.

4. A ball joint is claimed in claim 1 wherein the housing enclosing said ball member includes a mounting flange.

5. A ball joint as claimed in claim 1 wherein said flange is of stepped configuration having a pilot portion engageable in the opening in said support member and an enlarged peripheral portion seating on one face of said support member surrounding said opening therein.

6. A ball joint for suspension of wheels for motor vehicles or the like comprising a ball member supported in a bearing seat in a housing, an attachment bolt member formed integrally with the ball member, means for securing the assembly to a support member having an opening therein of a predetermined diameter and comprising a flange secured to the bolt member which engages in the opening of said support member, said opening and flange member being of a larger diameter than the diameter of said ball member.

* * * * *